(12) United States Patent
Nagano

(10) Patent No.: US 11,696,086 B2
(45) Date of Patent: *Jul. 4, 2023

(54) AUDITORY WEARABLE DEVICE MANAGEMENT SYSTEM, AUDITORY WEARABLE DEVICE MANAGEMENT METHOD, AND PROGRAM THEREOF

(71) Applicant: NEC Corporation, Tokyo (JP)

(72) Inventor: Hiroaki Nagano, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/492,899

(22) Filed: Oct. 4, 2021

(65) Prior Publication Data

US 2022/0030376 A1 Jan. 27, 2022

Related U.S. Application Data

(63) Continuation of application No. 16/824,912, filed on Mar. 20, 2020, now Pat. No. 11,166,119.

(30) Foreign Application Priority Data

Mar. 26, 2020 (JP) .................. 2019-058454

(51) Int. Cl.
*H04R 5/02* (2006.01)
*H04S 7/00* (2006.01)
(Continued)

(52) U.S. Cl.
CPC .............. *H04S 7/304* (2013.01); *H04R 3/12* (2013.01); *H04R 5/033* (2013.01); *H04S 3/008* (2013.01);
(Continued)

(58) Field of Classification Search
CPC ...... H04S 7/304; H04S 3/008; H04S 2400/01; H04S 2400/11; H04R 3/12; H04R 5/033
(Continued)

(56) References Cited

U.S. PATENT DOCUMENTS

2009/0154720 A1 6/2009 Oki
2010/0020998 A1* 1/2010 Brown .................. H04R 1/1041
381/375

(Continued)

FOREIGN PATENT DOCUMENTS

JP 2008-182509 A 8/2008
JP 2009-152666 A 7/2009
(Continued)

OTHER PUBLICATIONS

Japanese Office Action for JP Application No. 2019-058454 dated Jun. 2, 2020 with English Translation.
(Continued)

*Primary Examiner* — Ammar T Hamid

(57) ABSTRACT

An auditory wearable device management system for supporting effective use of an auditory wearable device shared by a collection of people (hereinafter abbreviated as an auditory device) is provided. An auditory wearable device management system for distributing audio information from one or more information sound sources to an auditory device worn by each wearer constituting a collection of people and acting collectively includes wearing information holding means that associates the wearer with a wearing status of the auditory device worn by the wearer as wearing information, audio information distribution control means that outputs distribution control information for designating the wearer, the wearer being a distribution destination of the audio information from each of the one or more information sound sources.

5 Claims, 2 Drawing Sheets

(51) Int. Cl.
*H04R 3/12* (2006.01)
*H04R 5/033* (2006.01)
*H04S 3/00* (2006.01)
*H04R 1/10* (2006.01)

(52) U.S. Cl.
CPC ....... *H04S 2400/01* (2013.01); *H04S 2400/11* (2013.01); *H04S 2400/15* (2013.01)

(58) Field of Classification Search
USPC .......................................................... 381/303
See application file for complete search history.

(56) References Cited

U.S. PATENT DOCUMENTS

| | | |
|---|---|---|
| 2016/0071525 A1 | 3/2016 | Di Censo et al. |
| 2016/0205488 A1* | 7/2016 | Gomez .................. H04S 1/007 381/17 |
| 2016/0248126 A1 | 8/2016 | Konjeti et al. |
| 2018/0367937 A1 | 12/2018 | Asada |
| 2019/0188013 A1 | 6/2019 | Krishna .................. G06N 5/04 |

FOREIGN PATENT DOCUMENTS

| | | |
|---|---|---|
| JP | 2015-136100 A | 7/2015 |
| JP | 2017-528990 A | 9/2017 |
| JP | 2018-509820 A | 4/2018 |
| JP | 2018-093503 A | 6/2018 |
| WO | 2017/061218 A1 | 4/2017 |
| WO | 2017/192467 A1 | 11/2017 |
| WO | 2017/203484 A1 | 11/2017 |
| WO | 2018/216121 A1 | 11/2018 |
| WO | 2019/026597 A1 | 2/2019 |

OTHER PUBLICATIONS

Extended European Search Report for EP Application No. EP20164399.6 dated Aug. 14, 2020.
Japanese Office Action for JP Application No. 2019-058454 dated Dec. 15, 2020 with English Translation.
Japanese Office Action for JP Application No. 2019/058454 dated Aug. 17, 2021 with English Translation.
JP Office Action for JP Application No. 2021-186814, dated Sep. 13, 2022 with English Translation.

* cited by examiner

AUDITORY WEARABLE DEVICE MANAGEMENT SYSTEM, AUDITORY WEARABLE DEVICE MANAGEMENT METHOD, AND PROGRAM THEREOF

CROSS-REFERENCE TO RELATED APPLICATIONS

The present application is a continuation application of U.S. patent application Ser. No. 16/824,912 filed on Mar. 20, 2020, which claims the benefit of priority from Japanese Patent Application 2019-058454 filed on Mar. 26, 2019, the disclosures of all of which are incorporated in their entirety by reference herein.

INCORPORATION BY REFERENCE

This application is based upon and claims the benefit of priority from Japanese patent application No. 2019-058454, filed on Mar. 26, 2019, the disclosure of which is incorporated herein in its entirety by reference.

TECHNICAL FIELD

The present disclosure relates to an auditory wearable device management system, an auditory wearable device management method, and an auditory wearable device management program. In particular, the present disclosure relates to an auditory wearable device management system, an auditory wearable device management method, and an auditory wearable device management program for an auditory wearable device shared and used by a collection of a certain number of people at field sites such as firefighting, rescue, defense, and construction.

BACKGROUND ART

Auditory wearable devices (hereinafter abbreviated as "auditory devices") are easy to wear as compared with visual devices used in AR (Augmented Reality) and VR (Virtual Reality). Thus, auditory devices can be easily borrowed or lent or wearers of the auditory devices can be easily changed in the field sites of, for example, firefighting, rescue, defense, and construction as compared with visual devices used in AR and VR. Furthermore, such an auditory device can be used even in situations where there is something blocking the vision and it is thus difficult to use the visual device. The auditory devices have such useful characteristics.

On the other hand, once a visual device or the like is worn, it substantially remains in a state where it is worn, and thus the visual devices or the like can be operated with associations between respective individuals and the visual devices or the like. On the contrary, due to the above-described characteristics of the auditory device that the wearing device is easy to wear, the auditory device is easily borrowed or lent, and a wearer is easily changed at the field sites, it is not easy to fixedly estimate a wearer of the auditory device and instead the relationship between a wearer and the auditory device should be considered to be always fluid.

Such characteristics of the auditory devices become particularly apparent when the auditory devices are shared by a collection of a certain number of people and operated. Moreover, at the time of wearing the auditory device, it is often more preferable that each person is allowed to randomly select and wear one or two auditory devices from randomly placed auditory devices than each person looks for and wears his/her own auditory device.

Furthermore, when field sites such as firefighting, rescue, defense, and construction are considered, it is necessary to give sufficient consideration on the possibility that wearers may exchange the auditory devices in order to deal with a malfunction of the auditory device.

Commonly, the auditory device has a relatively low ability to separate and transmit each piece of information compared to a visual device or the like. However, assuming the case where wearers are acting collectively, the auditory device is required to have an ability to simultaneously transmit information with a plurality of attributes, such as information addressed to each individual, broadcasting information to a group of wearers, and broadcasting information to all members of a collection of people. It is thus important for the auditory device to include means for identifying individual pieces of information, assuming that these pieces of information are presented to the auditory device simultaneously.

As a technology related to such an application of the auditory device, Published Japanese Translation of PCT International Publication for Patent Application, No. 2017-528990 "Techniques for Generating Multiple Listening Environments via Auditory Devices" discloses a technique for level-controlling a large number of conversations independently. International Patent Publication No. WO 2017/061218 "Sound Output Device, Sound Generation Method, and Program" discloses a method for localizing a sound image (sound source) at a specified position. Japanese Unexamined Patent Application Publication No. 2015-136100 "Hearing Aid System with Selectable Perceived Spatial Positioning of Sound Sources" discloses a technique for changing a position of a sound image (sound source) to a specified position so that audio information can be heard.

SUMMARY

However, the current technology related to the present disclosure such as the above-described Published Japanese Translation of PCT International Publication for Patent Application, No. 2017-528990 relates to the function when each wearer fixedly uses an auditory device (auditory wearable device) alone and does not consider at all about a specific mechanism for appropriately supporting an operation of the auditory device when a collection of a certain number of people share and use the auditory devices.

That is, in order to enable effective use of auditory devices shared by a collection of a certain number of people, as described above, the auditory device needs to be previously associated with a user (wearer). Furthermore, it is necessary to respond quickly and flexibly to scenes where the auditory device is exchanged or a wearing status is changed at operation sites. However, no specific technique for solving these problems has been presented in the current technology. In other words, the current technology does not provide a mechanism for each wearer to accurately acquire audio information directed to him/her when the wearer wears any of shared plurality of auditory devices in a situation where a large number of audio information pieces are multiplexed and transmitted.

(Object of the Present Development)

An example object of the present development is to provide an auditory wearable device management system, an auditory wearable device management method, and an auditory wearable device management program for supporting effective use of an auditory wearable device shared by a collection of people in view of the above-described problems.

In order to solve the above-described problems, an audible wearable device management system, an audible wearable device management method, and an audible wearable device management program according to the present disclosure mainly employ the following characteristic configurations.

(1) In an example aspect, an auditory wearable device management system for distributing audio information from one or more information sound sources to an auditory wearable device worn by each wearer constituting a collection of people and acting collectively includes:

wearing information holding means for associating the wearer with a wearing status of the auditory wearable device worn by the wearer as wearing information;

audio information distribution control means for outputting distribution control information for designating the wearer, the wearer being a distribution destination of the audio information from each of the one or more information sound sources; and wearer sound field forming means for forming a sound field from the audio information from the information sound source directed to the wearer and processing the audio information in a form enabling the wearer to identify the audio information according to the distribution destination of the audio information of the information sound source acquired based on the distribution control information and the wearing status of the auditory wearable device worn by the wearer acquired based on the wearing information.

(2) In another example aspect, an auditory wearable device management method for distributing audio information from one or more information sound sources to an auditory wearable device worn by each wearer constituting a collection of people and acting collectively includes:

associating the wearer with a wearing status of the auditory wearable device worn by the wearer as wearing information;

outputting distribution control information for designating the wearer, the wearer being a distribution destination of the audio information from each of the one or more information sound sources; and forming a sound field from the audio information from the information sound source directed to the wearer and processing the audio information in a form enabling the wearer to identify the audio information according to the distribution destination of the audio information of the information sound source acquired based on the distribution control information and the wearing status of the auditory wearable device worn by the wearer acquired based on the wearing information.

(3) In another example aspect, a auditory wearable device management program for distributing audio information from one or more information sound sources to an auditory wearable device worn by each wearer constituting a collection of people and acting collectively causes a computer to execute:

a wearing information holding function configured to associate the wearer with a wearing status of the auditory wearable device worn by the wearer as wearing information;

an audio information distribution control function configured to output distribution control information for designating the wearer, the wearer being a distribution destination of the audio information from each of the one or more information sound sources; and a wearer sound field forming function configured to form a sound field from the audio information from the information sound source directed to the wearer and process the audio information in a form enabling the wearer to identify the audio information according to the distribution destination of the audio information of the information sound source acquired based on the distribution control information and the wearing status of the auditory wearable device worn by the wearer acquired based on the wearing information.

BRIEF DESCRIPTION OF DRAWINGS

The above and other aspects, features, and advantages of the present disclosure will become more apparent from the following description of certain exemplary example embodiments when taken in conjunction with the accompanying drawings, in which.

EXAMPLE EMBODIMENTS

First Example Embodiment

Figure 1:
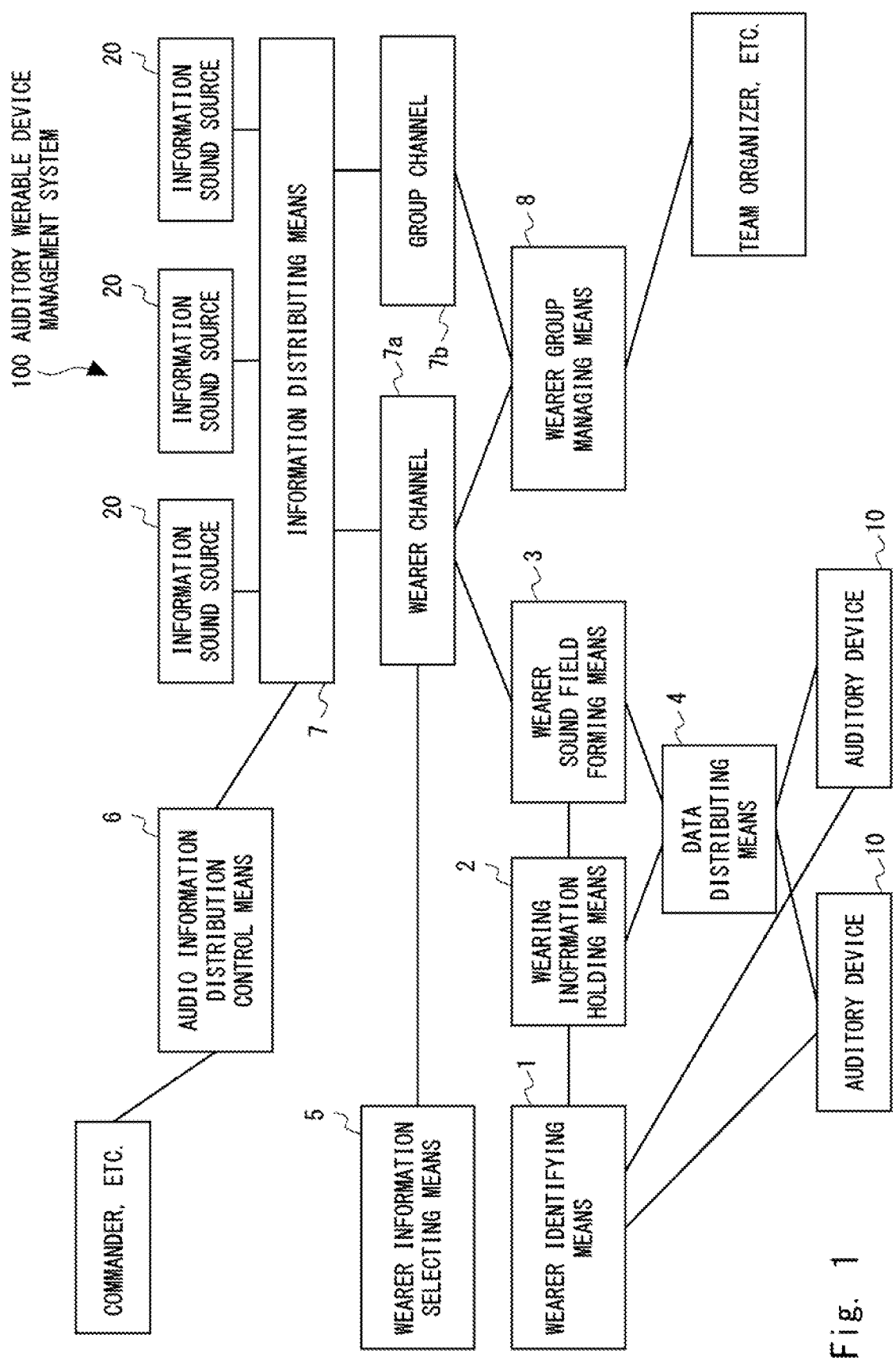
FIG. 1 is a system configuration diagram showing an example of a system configuration of an auditory wearable device management system according to the present disclosure.

Hereinafter, example embodiments of an auditory wearable device management system, an auditory wearable device management method, and an auditory wearable device management program according to the present disclosure will be described with reference to the attached drawings. In the following descriptions, the auditory wearable device management system and the auditory wearable device management method according to the present disclosure will be described. However, as a matter of course, the auditory wearable device management method may be implemented as an auditory wearable device management program that can be executed by a computer or the auditory wearable device management program may be recorded on a computer-readable recording medium. Further, in the following descriptions, the auditory wearable device is abbreviated as "auditory device". Furthermore, it is needless to say that the reference signs in the drawings shown in each of the attached drawings are added to respective elements for convenience as an example for easier understanding, and are not intended to limit the present disclosure to the illustrated example embodiments.

(Features of the Present Disclosure)

Prior to the descriptions of the example embodiments of the present disclosure, an outline of the features of the present disclosure will be described first. One of the main features of the present disclosure is that when a wearer wears an auditory device shared by a collection of people, a wearer wearing the auditory device is associated with a wearing status such as both of ears or a single ear. Another main feature of the present disclosure is to localize a sound field and individually form a sound field such as a volume level and a frequency according to the wearing status of the auditory device such as both of ears or a single ear worn by a wearer, who is a distribution destination of the audio information from an information sound source, so that the audio information is processed in a form that can be identified from other audio information and then transmitted to the corresponding wearer.

Another main feature of the present disclosure is that, for each of one or more information sound sources that output various types of audio information pieces used in the collection of people, the distribution destination of the audio information is classified into, for example, an individual wearer unit in the collection of people, a wearer group unit that is organized as appropriate in the collection of people, and all the wearers in the collection of people, and the wearers who are distribution destinations of the audio information from the respective information sound sources are defined in advance. Another main feature of the present disclosure is to enable a commander of the collection of people, a team organizer of the wearer group, and individual wearers to customize the attributes of the information sound source such as a position where the information sound source is arranged so that a sound field of the audio information from each of the information sound sources can be formed appropriately.

Thus, even under a usage environment where the auditory device is shared by the collection of people, each wearer can accurately listen to the necessary audio information while adapting the wearing status of the auditory device, and it becomes possible to flexibly respond to frequent changes in the borrowing/lending states and frequent changes in the wearing statuses of the auditory device at the field sites, thereby achieving an effect that the auditory device can be effectively used.

Further, the features of the present disclosure will be described in detail from the point of implementation means.

One of the main features of the present disclosure is that the following means is included as an operation support scheme of the auditory device shared by a collection of people, which is: wearing information holding means for associating the wearer and the wearing status of the auditory device using wearer identifying means for identifying an individual wearing the auditory device and the wearing status of the worn auditory device; information distributing means for distributing the audio information from the corresponding information sound source to an individual wearer, the wearer group, or all members in the collection of people, and wearer sound field forming means for forming the sound field according to attributes (position, frequency, volume level, phase, etc.) of the information distributing means and the information sound source, information filtered by the wearer's biological information, and the wearing status of each wearer.

Another main feature of the present disclosure is that the following means is included as control means for a commander of a collection of people, a team organizer who organizes a group, or the like to perform control and management. Specifically, audio information distribution control means for the commander of the collection of people or the like to control a distribution destination of the audio information of the information sound source, and wearer group managing means for the team organizer or the like to appropriately control a configuration of a wearer group in the collection of people.

Configuration Example of Example Embodiment of the Present Disclosure

Next, an example of a system configuration of the auditory wearable device management system according to the present disclosure will be described in detail with reference to FIG. 1. FIG. 1 is a system configuration diagram showing an example of a system configuration of the auditory wearable device management system according to the present disclosure. FIG. 1 also shows a system configuration for supporting and managing an operation of each auditory device when a plurality of auditory devices are shared and used by a certain number of people.

An auditory wearable device management system 100 shown in FIG. 1 at least includes wearer identifying means 1, wearing information holding means 2, wearer sound field forming means 3, data distributing means 4, wearer information selecting means 5, audio information distribution control means 6, information distributing means 7, and wearer group managing means 8 in order to manage a plurality of auditory devices 10 shared by a collection of people. The auditory wearable device management system 100 further includes one or more information sound sources 20 for providing various types of audio information pieces to each wearer.

Each of the plurality of auditory devices 10 has a function of determining whether this auditory device is in a wearing state. In this example embodiment, each of the plurality of auditory devices 10 further includes a function of acquiring identification information for identifying a wearer who wears this auditory device when the hearing device enters the wearing state. When it is determined that the auditory device is worn, the auditory device 10 transmits the identification information to the wearer identifying means 1.

The wearer identifying means 1 determines who the wearer is and a wearing status indicating whether the auditory device 10 is worn on the right or left ear based on the identification information transmitted from each auditory device 10. Then, the wearer identifying means 1 stores determined information in the wearing information holding means 2 as wearing information regarding the auditory device 10 that is worn.

In this example embodiment, the identification information for identifying the wearer wearing the auditory device 10 is assumed to be based on the wearer's biological information collected by the auditory device 10 (e.g., information about orientation and movement of ear and head, blood flow, shape of ear hole). The identification information may not be transmitted from the auditory device 10 and instead may be acquired in the wear identifying means 1 based on wearer authenticating means for using login information and the like that use audio authenticating means and a voice and some kind of a procedure (such as removing the auditory device 10 from ears one by one in turn) for determining the wearing status. Furthermore, the information acquired by the voice recognition means, the wearer authenticating means, and the like may be used together with the biological information and the like.

The information sound source 20 outputs various pieces of audio information that can be presented to the wearer of the auditory device 10. The sound information distribution control means 6 controls which wearer in the collection of people to distribute the audio information from which information sound source from among one or more information sound sources 20 based on an instruction from the commander or the like of the collection of people. Then, the audio information distribution control means 6 outputs, to the information distributing means 7, distribution control information for designating a wearer as a distribution destination of the audio information of each information sound source 20.

The information distributing means 7 selects the wearer as the distribution destination for each piece of the audio information of each information sound source 20 based on the distribution control information from the audio information distribution control means 6, and distributes the audio information of the information sound source 20 to the corresponding wearer.

Typically, the information distributing means 7 is implemented in a form of a topic, a channel, etc. based on the Publish-Subscribe model, and distributes the audio information in such a way that data is distributed to individual wearers, all wearers, or a wearer group, which have been defined for each piece of the audio information (topic) of the information sound source 20 as targets (subscriber of topic) who listen to the audio information. The audio information for individual wearers to be distributed by the information distributing means 7 and the audio information to be broadcasted to all the wearers are sent to a wearer channel 7a, whereas the audio information to be broadcasted to the wearer group organized as appropriate is sent temporarily to a group channel 7b.

Note that the audio information for the individual wearers to be distributed by the information distributing means 7 is also controlled by the wearer information selecting means 5 that allows each wearer to designate the information, and the wearer channel 7a to which the audio information from the information distributing means 7 is sent is controlled by the wearer information selecting means 5, so that the audio information to be received can be selected for each individual wearer.

Further, the audio information to be broadcasted to the wearer group is temporarily sent to the group channel 7b, the distribution destination is controlled by the wearer group managing means 8, the audio information is defined as the audio information to be broadcasted to each wearer who is a member of the wearer group, and then transferred to the wearer channel 7a. As a result, the audio information to be broadcasted is sent to all the members of the wearer group designated as the broadcast distribution destination. Here, a team organizer or the like in the collection appropriately designates a member(s) of the wearer group as a broadcast distribution destination(s) of the audio information of the information sound source 20, and the member(s) is registered in advance in the wearer group managing means 8 for managing the members of the wearer group.

Returning to the description of FIG. 1, the wearer sound field forming means 3 forms a sound field from the audio information directed to the wearer sent to the wearer channel 7a in a form that enables this wearer to separate and identify this audio information from other audio information. Then, the wearer sound field forming means 3 localizes the sound field, and processes a frequency, a volume level, etc. Note that when the audio information for the wearer is processed, the wearer sound field forming means 3 acquires the wearing status, from the wearing information holding means 2, such as whether the wearer who is a distribution destination of the audio information is wearing the auditory device 10 on a single ear or both ears in addition to the attributes (position, frequency, volume level, phase, etc.) of the information sound source 20 to be processed and the wearer's biological information. When the processing of the audio information is completed, the wearer sound field forming means 3 sends the processed audio information to the data distributing means 4 as processed data.

The data distributing means 4 distributes the processed data received from the wearer sound field forming means 3 to the auditory device 10 of the wearer designated as the distribution destination. Here, when the data distributing means 4 receives the processed data from the wearer sound field forming means 3, the data distributing means 4 first accesses the wearing information holding means 2 that holds the associations between the wearers and the auditory devices 10, and acquires the information about the auditory device 10 worn by the wearer designated as the distribution destination of the processed data received from the wearer sound field forming means 3. After that, the data distributing means 4 distributes the processed data received from the wearer sound field forming means 3 to the auditory device 10 worn by the wearer who is the distribution destination.

(Description of Operation According to Example Embodiment of the Present Disclosure)

Next, an operation of the auditory wearable device management system 100 shown in FIG. 1 as an example embodiment of the present disclosure will be described in detail.

When the wearer wears the auditory device 10, information for identifying this wearer is transmitted from the auditory device 10 to the wearer identifying means 1. Here, as described above, the transmitted information is, for example, the wearer's biological information collected by the auditory device 10. The wearer identifying means 1 determines whether the wearer is wearing the auditory device 10 on his/her right ear, left ear, or both ears, based on the information transmitted from the auditory device 10.

Note that when such information cannot be acquired only from the wearer's biological information sent from the auditory device 10, as described above, the biological information may be substituted by or used together with user identification processing using audio and the like, login processing, and a procedure (such as removing the auditory device 10 from ears one by one in turn) for determining the wearing state.

The wearing information determined by the wearer identifying means 1 (wearer and wearing state of the auditory device 10) is held in the wearing information holding means 2 and is used as information for generating sound sources in the wearer sound field forming means 3 and used for determining a relationship between the wearer and the auditory device 10 in the data distributing means 4 and the like.

With such a configuration including the wearer identifying means 1 and the wearing information holding means 2, the relationship between the auditory device 10 and the wearer becomes fluid, and it is possible to flexibly and quickly respond to changes in the wearing state of the auditory device 10 and changes in the wearer of the auditory device 10 when the auditory device 10 is borrowed or lent at the usage sites.

The audio information presented to the wearer is the audio information held by one or more information sound sources 20. The information sound source 20 may further include an information sound source that uses the audio information not accompanied by absolute position information for provision of information in addition to a guidance sound source that uses the audio information accompanied by the absolute position information for guidance. Here, the guidance sound source is fixedly arranged at the position indicated by the absolute position information, and the fixed position is set and registered as an attribute of the information sound source 20 in advance. On the other hand, the information sound source can be arranged at any position by the wearer, the commander of the collection of people, the team organizer who manages the wearer group, or the like, and the arranged position is set and registered as an attribute of the information sound source 20.

Moreover, the commander of the collection of people or the like in the auditory wearable device management system 100 provides, to each information sound source 20, attributes regarding the distribution of the audio information in addition to the attribute indicating the position at which the information sound source 20 is arranged and the attributes such as the frequency, volume level, etc. The attributes regarding the distribution of the audio information include, for example, distributing information to each individual wearer constituting the collection of people, broadcasting information to all members of the wearer group organized as appropriate by the team organizer or the like in the collection of people, broadcasting information to all wearers constituting the collection of people, and not distributing information. The audio information of the information sound source 20 corresponding to the wearer channel 7a assigned to each individual wearer is distributed according to the provided attributes regarding the distribution.

Furthermore, the audio information addressed to all the members of the wearer group is temporarily distributed to the group channel 7b by the information distributing means 7. After that, the audio information addressed to all the members of the wearer group is transferred from the group channel 7b to the wearer channel 7a under control of the wearer group managing means 8, and the same audio information is sent to the individual members (each wearer) of the wearer group designated by the wearer group managing means 8. Here, the team organizer of the wearer group controls management information of the wearer group managing means 8 (i.e., information about the registered members of the wearer group) to thereby flexibly respond to changes in the members of the wearer group.

Figure 2:
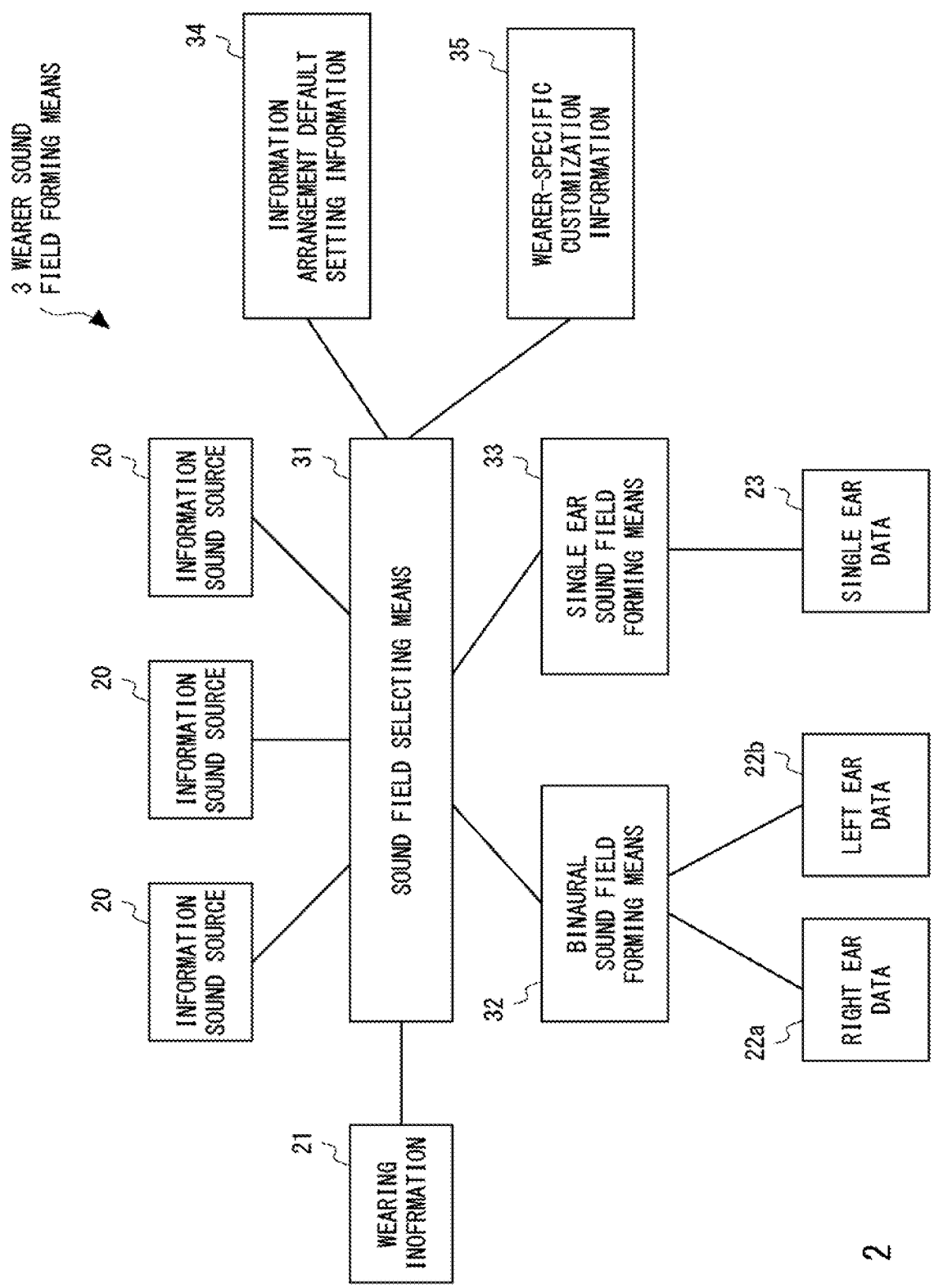
FIG. 2 is a block configuration diagram showing an example of an internal configuration of wearer sound field forming means of the auditory wearable device management system shown in FIG. 1.

The wearer sound field forming means 3 having an internal configuration as shown in FIG. 2 processes the audio information sent to the wearer channel 7a into a form suitable for separation from other audio information and for identification. In other words, the wearer sound field forming means 3 processes the audio information from which a sound field is to be formed in a form suitable for separation from other audio information and for identification according to the wearer which is the distribution destination of the audio information designated in the distribution control information or the like transmitted from the audio information distribution control means 6 and the wearing status of the wearer indicated by the wearing information held in the wearing information holding means 2, in addition to the attributes (position, frequency, volume level, phase, etc.) accompanying the information sound source 20, which is a source for generating the target audio information, and the wearer's biological information. FIG. 2 is a block diagram showing an example of the internal configuration of the wearer sound field forming means 3 of the auditory wearable device management system 100 shown in FIG. 1.

As described above, the wearer sound field forming means 3 forms a sound field processed into a form that enables the wearer designated by the audio information distribution control means 6, the wearer information selecting means 5, and the wearer group managing means 8, etc., to identify the audio information of each of the plurality of information sound sources 20 (guidance sound source of various information sound sources). Therefore, as shown in FIG. 2 as an example, the wearer sound field forming means 3 includes sound field selecting means 31, binaural sound field forming means 32, single ear sound field forming means 33, and information pieces which are information arrangement default setting information 34 and wearer-specific customization information 35.

The sound field selecting means 31 selects, for each wearer wearing the auditory device 10, forming means for forming a sound field directed to the wearer based on the information arrangement default setting information 34, the wearer-specific customization information 35, and the wearing information 21 of the auditory device 10 held in the wearing information holding means 2, in addition to the attributes (position, frequency, volume level, etc.) of the target information sound source 20. Then, the selected forming means, i.e., either the binaural sound field forming means 32 or the single ear sound field forming means 33, is started.

As described above, the wearing information 21 includes information for identifying whether each wearer is wearing the auditory device 10 on both of his/her ears, on a left ear, or on a right ear. The information arrangement default setting information 34 is information in which a default value is set regarding the position where the information sound source 20 is arranged, and a predetermined default position is set. Further, the wearer-specific customization information 35 indicates that the arrangement of the information sound source 20 is changed from the default value to the position customized for each wearer based on an instruction from the commander of the collection of people, the team organizer of the wearer group, the wearer himself/herself, or the like. That is, the information arrangement default setting information 34 and the wearer-specific customization information 35 determine the position where the sound field of the audio information of each information sound source 20 is localized as viewed from the wearer.

Then, as a result of referring to the wearing information 21, when it is found that the wearer wears the auditory device 10 on both of his/her ears, the binaural sound field forming means 32 refers to the information arrangement default setting information 34 and the wearer-specific customization information 35 and processes the audio information of each information sound source 20 in such a way that a sound field of each piece of the audio information viewed from the wearer is located at different positions by a difference in the volume levels given to both the ears of the wearer, and then outputs the processed audio information to the data distributing means 4 as right ear data 22a and left ear data 22b.

On the other hand, as a result of referring to the wearing information 21, when it is found that the wearer wears the auditory device 10 on either his/her left ear or right ear, the single ear sound field forming means 33 processes the audio information of each information sound source 20 in such a way that the frequency and the volume level are used mainly for determining the audio information from each information sound source 20, and then outputs the processed audio information to the data distributing means 4 as single ear data 23.

Consequently, in the wearer sound field forming means 3, as described above, the audio information of the information sound source 20 is output to the corresponding auditory device 10 via the data distributing means 4 as the processed data which has been processed in such a way that the sound field of the audio information can be easily identified from other audio information. Thus, the wearer of the auditory device 10 can easily understand the audio information of the corresponding information sound source 20 by listening to the processed data received via the data distributing means 4.

Note that the data distributing means 4 accesses the wearing information holding means 2 to acquire information about the auditory device 10 worn by the wearer of the distribution destination, and sends the processed data formed by the wearer sound field forming means 3 as the audio information from the corresponding information sound source 20 to the auditory device 10 worn by the wearer. As a result, various types of audio information pieces from each information sound source 20 are presented in a form that can be appropriately recognized by the wearer designated as the distribution destination.

Note that when the audio information of the information sound source 20 includes the absolute position information to be used for guidance as an attribute, and when the position and posture of the wearer can be estimated by assistance of the auditory device 10 or some other means, this information sound source 20 is fixed at the position indicated by the absolute position information. On the other hand, when the information sound source 20 (information sound source) is not accompanied by the absolute position information for guidance, the position of the sound field of this information sound source 20 can be freely set by the wearer, commander, or the like, and thus the information sound source 20 can be arranged at a specified position.

Additionally, a default position where the information sound source 20 is arranged is normally set in the information arrangement default setting information 34. However, as described above, the arrangement position of the information sound source 20 can be customized and designated in the wearer-specific customization information 35.

Description of Effect of Example Embodiment

As described above in detail, the following effects can be achieved in this example embodiment.

Firstly, the audio information can be reliably delivered to each wearer to whom audio information is to be provided, while flexibly responding to changes in lending/borrowing states of the auditory device 10 between the wearers acting collectively and changes in wearing states. The reason for this is that instead of designating the auditory device 10 and sending the audio information to the designated auditory device 10, the wearer is designated and the audio information is sent to the auditory device 10 worn by this wearer. That is, an operation for distributing the audio information is controlled using, as a key, the wearing information in which the wearer is associated with (mapped to) the auditory device 10 by the wearing information holding means 2.

Secondly, even when a plurality of audio information pieces are delivered, the wearer can hear and distinguish between each of the plurality of audio information pieces. The reason for this is that, it is possible to form a sound field suitable for the wearing status of the auditory device 10 worn by the wearer, who is the distribution destination of the audio information, specifically, according to whether the auditory device 10 is worn on both of the ears of the wearer or on a one ear not only according to the attributes of the information sound source 20, because the wearer sound field forming means 3 is included. The wearer sound field forming means 3 forms a sound field from the audio information in association with the attributes of the information sound source 20, which is a source of generating the audio information and the wearing status of the auditory device 10. Furthermore, the commander of the system or the like may set, as a default value, an appropriate arrangement state of the position of the information sound source, which is a source of generating the audio information, in the information arrangement default setting information 34 or may appropriately customize the position of the information sound source for each wearer as necessary in the wearer-specific customization information 35 as needed.

Thirdly, even when the wearer of each auditory device 10 is configured to constitute a collection of people, it is easy to provide the audio information classified into the respective categories, specifically, to each individual constituting the collection of people, commonly to all wearers in the group, and to all members of each wearer group organized as appropriate. The reason for this is that the wearer information selecting means 5, the audio information distribution control means 6, and the wearer group managing means 8 are included as means for managing the distribution destination and group organization of the audio information.

Fourthly, by selecting either the sound field localization fixed on absolute coordinates or the sound field localization relative to the wearer, the audio information to be used for guidance and the like and the audio information to be used by individuals for information identification can be used together while these pieces of the audio information are separated from each other. Further, the control of these pieces of the audio information can be performed not only by the commander of the collection of people but also by the wearer side depending on the ability of the auditory device 10. The reason for this is that the information sound source 20 allows co-existence of a case in which the audio information accompanied by the absolute position information is used as the information sound source 20 and a case in which the audio information not accompanied by the absolute position information as the information sound source 20. Another reason for this is that the wearer sound field forming means 3 for forming a sound field according to whether the absolute position information is added to the information sound source 20 is included.

Other Example Embodiments of the Present Disclosure

In the above-described example embodiments, the example embodiments related to a mechanism for effectively identifying audio information only in the auditory device 10 have been described. However, the present disclosure does not prevent cooperation of an auditory device with a visual device or other devices. In particular, visual devices are often capable of acquiring accurate detailed information about position and posture of a wearer. It is thus possible to accurately identify the audio information received by the wearer of the auditory device 10 by cooperation with the above-described wearer sound field forming means 3 described using FIG. 1.

In the above-described example embodiments, the auditory device 10 is described assuming that it is an earphone type device that is inserted into an ear(s) or a headphone type device that is brought into close contact with an ear(s). However, the present disclosure is not limited to them, and the auditory device 10 may be disposed on a wearer's body surface or the like or installed outside the vicinity of the wearer, as long as the auditory device 10 can form a sound field and identify a wearer. Those various types of auditory devices 10 may be present at the same time.

Additionally, various kinds of control means, managing means, setting means, etc. in the above-described example embodiments can easily coordinate with smart devices such as smartphones and tablet terminals held by the respective wearers, and for example, various information setting functions related to the formation of a sound field may be performed in cooperation with the smart devices.

Furthermore, the information sound source 20 may be configured to include a function for providing audio information in many languages at the same time or a function for translating audio information in almost real time, in which the wearer sound field forming means 3 maps the audio information to a language for each wearer or wearer group, so that the information sound source 20 is configured to further include an element for facilitating identification of the audio information.

The configurations of the example embodiments of the present disclosure have been described above. However, it should be noted that such example embodiments are merely examples of the present disclosure and do not limit the present disclosure in any way. Those skilled in the art would readily understand that various modifications and changes can be made according to a specific application without departing from the scope of the present disclosure.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Each of the above-described example embodiments can be combined as desirable by one of ordinary skill in the art.

According to the auditory wearable device management system, the auditory wearable device management method, and the auditory wearable device management program according to the present disclosure, an example advantage according to the above-described example embodiments is to exert the following features.

Firstly, the audio information can be reliably delivered to each wearer to whom audio information is to be provided, while flexibly responding to changes in the lending/borrowing states of the auditory device between the wearers acting collectively and changes in the wearing states. The reason for this is that instead of designating the auditory device and providing the audio information to the designated auditory device, the wearer is designated and the audio information is provided to the auditory device worn by this wearer at that time. That is, an operation for distributing the audio information is controlled using, as a key, the information in which the wearer is associated with (mapped to) the auditory device by the wearing information holding means.

Secondly, even when a plurality of audio information pieces are delivered, the wearer can hear and distinguish between each of the plurality of audio information pieces. The reason for this is that, it is possible to form a sound field suitable for the wearing status of the auditory device worn by the wearer, who is the distribution destination of the audio information, specifically, according to whether the auditory device is worn on both of the ears of the wearer, who is the distribution destination, or on a single ear, because the wearer sound field forming means is included. The wearer sound field forming means forms a sound field from the audio information in association with the wearing status of the auditory device worn by the wearer, who is the distribution destination of the audio information, not only based on the attributes (position, frequency, etc.) of the information sound source, which is a source of generating the audio information.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A distribution system is configured to:
   acquire biological information of a wearer and a wearing state of the auditory wearable device worn by the wearer from the auditory wearable device,
   identify the wearer based on the biological information,
   select a distribution destination of audio information as either just the wearer, a group of wearers of auditory wearable devices including the wearer, or all wearers of auditory wearable devices including the wearer,
   form a sound field of the audio information to be distributed based on the biological information and the wearing state, and
   distribute the audio information in which the sound field is formed to the auditory wearable device of the wearer.

2. The distribution system according to claim 1, wherein determine whether the wearer is wearing the auditory wearable device on both ears or on just one ear based on the wearing state,
   in response to determining that the wearer is wearing the auditory wearable device on both ears, form the sound field from the audio information and process the audio information in such a way that the audio information is localized at different positions, from a perspective of the wearer, by a difference in volume levels provided to both ears, and output the processed audio information as right audio information for a right ear and left audio information for a left ear, and
   in response to determining that the wearer is wearing the auditory wearable device on just one ear, form the sound field and process the audio information using a frequency or a volume level, and output the processed audio information as audio information for just one ear.

3. The distribution system according to claim 1, wherein a guidance sound source is configured to use the audio information accompanied by absolute position information for guidance and an information sound source is configured to use the audio information not accompanied by the absolute position information, wherein
   the guidance sound source is configured to fix a position where the guidance sound source is arranged, and set and register the fixed position as an attribute of the information sound source in advance, and
   the information sound source is arranged at a specified position, and the arranged specified position is set and registered as an attribute of the information sound source.

4. A distribution method comprising:
   acquiring biological information of a wearer and a wearing state of the auditory wearable device worn by the wearer from the auditory wearable device,
   identifying the wearer based on the biological information,
   selecting a distribution destination of audio information as either just the wearer, a group of wearers of auditory wearable devices including the wearer, or all wearers of auditory wearable devices including the wearer, forming a sound field of the audio information to be distributed based on the biological information and the wearing state, and distributing the audio information in which the sound field is formed to the auditory wearable device of the wearer.

5. A distribution system is configured to:

acquire biological information of a wearer and a wearing state of the auditory wearable device worn by the wearer from the auditory wearable device, identify the wearer based on the biological information, select a distribution destination of audio information as either just the wearer, a group of wearers of auditory wearable devices including the wearer, or all wearers of auditory wearable devices including the wearer, distribute the audio information the auditory wearable device of the wearer.

\* \* \* \* \*